(12) United States Patent
Chang et al.

(10) Patent No.: US 8,856,328 B2
(45) Date of Patent: Oct. 7, 2014

(54) FAIL-OPEN NETWORK TECHNIQUES

(75) Inventors: Patricia Chang, San Ramon, CA (US); Jack T. Tang, Danville, CA (US)

(73) Assignee: Cellco Partnership, Basking Ridge, NJ (US)

( * ) Notice: Subject to any disclaimer, the term of this patent is extended or adjusted under 35 U.S.C. 154(b) by 221 days.

(21) Appl. No.: 13/193,980

(22) Filed: Jul. 29, 2011

(65) Prior Publication Data

US 2013/0031252 A1    Jan. 31, 2013

(51) Int. Cl.
 *G06F 15/16* (2006.01)
 *H04L 29/14* (2006.01)
 *H04L 29/06* (2006.01)

(52) U.S. Cl.
 CPC ............ *H04L 69/40* (2013.01); *H04L 63/0892* (2013.01)
 USPC ........... 709/225; 709/219; 709/223; 709/224; 709/226; 709/229

(58) Field of Classification Search
 CPC ............ G06F 11/0709; G06F 11/0754; G06F 11/2035; G06F 11/2038; G06F 11/2048; G06F 11/00; H04L 12/5895; H04L 51/38; H04L 12/00; H04L 12/1403; H04L 12/1428; H04L 12/26; H04L 12/5692; H04L 12/6418; H04L 41/0668; H04L 63/00; H04L 63/0892; H04L 65/1016; H04L 69/40
 See application file for complete search history.

(56) References Cited

U.S. PATENT DOCUMENTS

| | | | |
|---|---|---|---|
| 7,509,520 B1 * | 3/2009 | Nguyen et al. | 714/4.2 |
| 2011/0194444 A1 * | 8/2011 | Karstens | 370/252 |
| 2011/0211527 A1 * | 9/2011 | Agarwal et al. | 370/328 |
| 2011/0280215 A1 * | 11/2011 | Nakagawa et al. | 370/331 |
| 2012/0100848 A1 * | 4/2012 | Miklos | 455/432.1 |
| 2012/0127851 A1 * | 5/2012 | Le Rouzic et al. | 370/216 |

FOREIGN PATENT DOCUMENTS

WO   WO 2010092292 A1 *   8/2010   ............. H04L 12/26

\* cited by examiner

*Primary Examiner* — Wing F Chan
*Assistant Examiner* — Padma Mundur (57) ABSTRACT

A network device may receive, from a user device, a request for network access to a network and communicate a request, to a subscriber data storage, for subscriber data, corresponding to the user device, to verify whether the user device may be granted network access. The network platform may determine, in response to communicating the request to the subscriber data storage, that the subscriber data storage is non-responsive and executing a fail-open function in response to determining that the subscriber data storage is non-responsive. The fail-open function may include processing the request for network access without subscriber data from the subscriber data storage and granting network access to the user device without verifying that the user device is permitted to access the network.

18 Claims, 9 Drawing Sheets

FAIL-OPEN NETWORK TECHNIQUES

BACKGROUND

Currently available network technologies include a variety of different networks, such as local area networks (LANs), wide area networks (WANs), and wireless networks. In order to gain access to some networks or to some network services, subscriber devices must often undergo authentication processes, authorization processes, identification processes, and/or one or more other types of network-based processes. While such processes may provide some benefits to a network (e.g., network security), such processes may also jeopardize the reliability of a network. For instance, when a network device that is critical to authenticating subscriber devices suddenly becomes overloaded, fails, or otherwise ceases to operate adequately, many or all of the subscriber in that network may be excluded from obtaining network services even though all of the other systems and devices in the network are operating properly.

DETAILED DESCRIPTION OF PREFERRED EMBODIMENTS

The following detailed description refers to the accompanying drawings. The same labels and/or reference numbers in different drawings may identify the same or similar elements.

In one or more implementations, described herein, devices may be used to enhance network robustness and reliability by implementing one or more network fail-open functions. For example, a network device, such as a serving gateway (SGW), may receive a request for network access from another device, such as a user device. The network device may communicate a request to a subscriber data storage, such as a home subscriber server (HSS), for subscriber data, corresponding to the user device, in order to, for example, verify whether the user device may be granted network access. In some implementations, if the device does not receive a response from the subscriber data storage after a given period of time, the device may repeat the request one or more times depending on the implementation.

At some point, the device may determine or conclude that the subscriber data storage is non-responsive and may execute a fail-open function in response to the non-responsiveness of the subscriber data storage. Execution of a fail-open function may involve a variety of one or more types of operations to continue processing the request for network service, including bypassing (e.g., skipping) one or more call processing operations relating to the subscriber data storage (e.g., one or more authorization operations), sending the request for service received from the user device to another device, and/or one or more other types of operations relating to call processing. As described throughout this specification, one or more other devices involved in call processing (e.g., a packet data network gateway (PGW), a home agent (HA) device, etc.) may operate in a similar manner to enable a network to continue servicing user devices even though one or more devices in the network has suddenly failed. These and other systems, devices, features and operations for enhancing network robustness and reliability are provided below.

A fail-open function, as used herein, may include one or more systems, devices, processes, and/or operations that enable a network to continue functioning even though one or more systems, devices, processes, and/or operations of the network are no longer operating or are otherwise operating at an unacceptable level.

Figure 1:
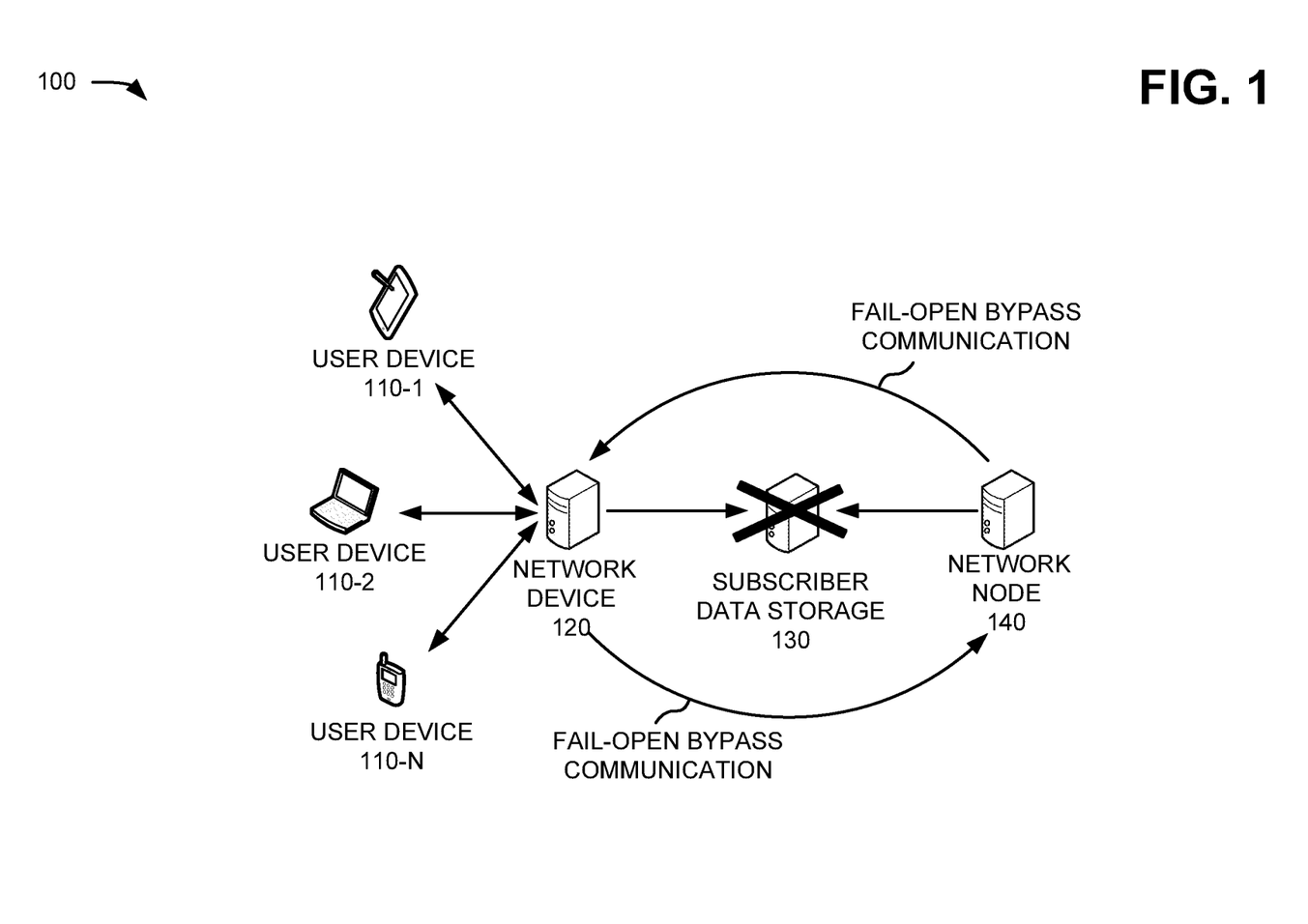
FIG. 1 is a diagram of an example overview of an implementation described herein.

FIG. 1 is a diagram of an example overview 100 of an implementation described herein. As illustrated, overview 100 may include user devices 110-1, 110-2, . . . , 110-N (where N≥1) (collectively referred to as "user devices 110," and individually as "user device 110"), network device 120, subscriber data storage 130, and network node 140. In some implementations, the systems and devices of FIG. 1 may correspond to one or more systems or devices discussed elsewhere in this specification.

User device 110 may include one or more of a variety of computing devices. For example, user device 110 may include a smart phone, a laptop computer, a tablet computer, a desktop computer, a virtual machine, or one or more other types of computing or communication devices. User device 110 may be capable of operating in a manner that is consistent with one or more environments, systems, devices, functions, and/or operations described herein. For instance, user device 110 may be capable of gathering, processing, searching, storing, evaluating, receiving and/or providing data or other types of information. In a particular example, user device 110 may be capable of communicating with network device 120 in order to obtain access to one or more types of network services.

Network device 120 may include one or more of a variety of computing and/or communication devices. For example, network device 120 may include a desktop computer, a virtual machine, a server, a cluster of servers, a router, a switch, a hub, a gateway, or one or more other types of computing or communication devices. Network device 120 may be capable of operating in a manner that is consistent with one or more environments, systems, devices, functions, and/or operations described herein. For instance, network device 120 may be capable of gathering, processing, searching, storing, evaluating, receiving and/or providing data or other types of information.

In a particular example, network device 120 may include a network platform capable of receiving a request for a network service from user device 110, communicate a request for subscriber data to subscriber data storage 130, determine that subscriber data storage 130 is non-responsive or otherwise inoperable, and/or execute a fail-open function in order to bypass subscriber data storage 130 and continue processing the request for the network service by, for example, forwarding the request to network node 140 as depicted in FIG. 1. In some implementations, network device 120 may include a packet data serving node (PDSN), a serving gateway (SGW) device, a mobility management entity (MME) device, or one or more other types of network devices capable of operating in a network environment.

Subscriber data storage 130 may include one or more of a variety of computing and/or communication devices. For example, subscriber data storage 130 include a desktop computer, a virtual machine, a server, a cluster of servers, a router, a switch, a hub, a gateway, or one or more other types of computing or communication devices. Network device 120 may be capable of operating in a manner that is consistent with one or more environments, systems, devices, functions, and/or operations described herein. For instance, network device 120 may be capable of gathering, processing, searching, storing, evaluating, receiving and/or providing data or other types of information. In a particular example, subscriber data storage 130 may be capable of maintaining a repository of subscriber information, participate in subscriber authentication processes, participate in subscriber authorization processes, participate in subscriber identification processes, or engage in one or more other types of network-related activities.

Subscriber data storage 130 may maintain a log, a table, a registry, a repository, a database and/or one or more other types of data storage structures capable of storing subscriber data (e.g., information relating to device authentication, device authorization, device identification, user profiles, etc.). In some implementations, subscriber data storage 130 may store data in an organized fashion, which may include using identifiers, indexes, tables, linked lists, databases, or one or more other types of data organizational schemes. In some implementations, subscriber data storage 130 may include a home location register (HLR) device, a home subscriber server (HSS), an authentication, authorization, accounting (AAA) server, a policy control rating function (PCRF) server, a real-time reporting (RTR) server, and/or one or more other types of devices capable of storing network subscriber information and operating in a network environment.

Network node 140 may include one or more of a variety of computing and/or communication nodes. For example, network node 140 may include a desktop computer, a virtual machine, a server, a cluster of servers, a router, a hub, a gateway, or one or more other types of computing or communication nodes. Network node 140 may be capable of operating in a manner that is consistent with one or more environments, systems, devices, functions, and/or operations described herein. For instance, network node 140 may be capable of gathering, processing, searching, storing, evaluating, receiving and/or providing data or other types of information.

In a particular example, network node 140 may include a network platform capable of performing a fail-open function in a manner that is consistent with, complementary to, or analogous to the fail-open function performed by network device 120. For instance, network node 140 may receive a request for a network service that is forwarded by network device 120, communicate one or more requests for subscriber data to subscriber data storage 130, determine that subscriber data storage 130 is non-responsive, and/or execute a fail-open function in order to bypass subscriber data storage 130 and continue processing the request for the network service by, for example, responding positively to network device 120 as depicted in FIG. 1. In some implementations, network node 140 may include a HA device, a PGW, or one or more other types of network devices capable of operating in a network environment.

Network device 120 may receive a request for network access from user device 110 and, in response, may communicate a request to subscriber data storage 130 for subscriber data in order to, for example, verify whether user device 110 may be granted network access. If network device 120 does not receive a response from subscriber data storage 130 after a given period of time, network device 120 may repeat the request one or more times depending on the implementation. At some point, network device 120 may conclude that subscriber data storage 130 is non-responsive and may initiate or execute a fail-open function. The fail-open function may include bypassing one or more call processing operations relating to subscriber data storage 130 and sending the request for service received from user device 110 to network node 120.

Figure 2:
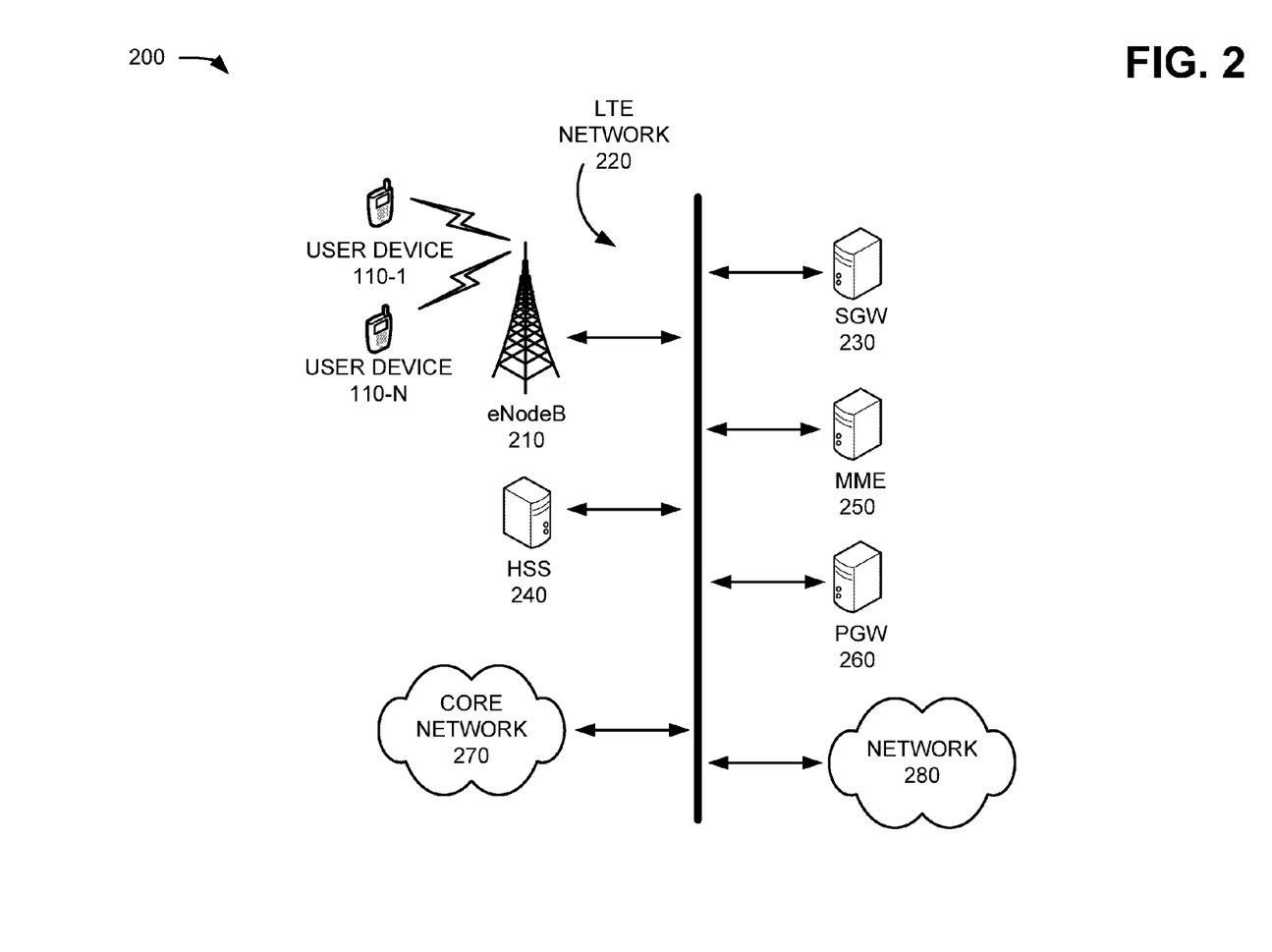
FIG. 2 is a diagram of an example environment in which systems and/or methods, described herein, may be implemented.

FIG. 2 is a diagram of an example environment 200 in which systems and/or methods, described herein, may be implemented. As illustrated, environment 200 may include user devices 110, eNodeB 210, Long Term Evolution (LTE) network 220, SGW 230, HSS 240, MME 250, PGW 260, core network 270, and network 280. While FIG. 2 shows a particular number and arrangement of networks and devices, in alternative implementations, environment 200 may include additional networks or devices, fewer networks or devices, different networks or devices, or differently arranged networks or devices than those depicted in FIG. 2.

As mentioned above, user device 110 may include one or more of a variety of computing or communication devices, including one or more deices capable of communicating via a wireless interface with eNodeB 210. eNodeB 210 may include an LTE base station that may cover a particular geographic area serviced by LTE network 220. eNodeB 210 may include one or more devices that receive information, such as audio, video, text, and/or other data, from devices, such as SGW 230, and/or devices that transmit the information to user devices 110 via an air interface. eNodeB 210 may also include one or more devices that receive information via an air interface and/or one or more devices that transmit the information to other network devices.

LTE network 220 may include core network 270, which may be implemented in accordance with the Third Generation Partnership Project (3GPP) LTE wireless communication standard (e.g., an evolved packet core (EPC) network, an evolution-data optimized (EDO) network, etc.). LTE network 220 may include a packet-switched core network 270 that supports high-speed wireless and/or wireline broadband access technologies, include Voice over Internet Protocol (Voice over IP, VOIP) services. Additionally, LTE network 220 may provide packet-switched voice services (e.g., which may be circuit-switched) using an IP Multimedia Subsystem (IMS) network (not shown in FIG. 2). LTE network 220 may include one or more eNodeBs 210, SGWs 230, HSSs 240, MMEs 250, PGWs 260, and/or one or more other types of devices capable of operating in LTE network 220 or another type of network.

SGW 230 may perform various network functions, such as managing user device data connections, forwarding user device 110 data packets through LTE network 220, or one or more other types of network functions. SGW 230 may also, or alternatively, operate as an anchor during handovers between eNodeBs 210 and between LTE and other 3GPP technologies. As mentioned above with reference to FIG. 1, since network device 120 may be implemented by SGW 230, SGW 230 may also, or alternatively, be capable of executing a fail-open function and/or be capable of performing one or more other functions, processes, and/or operations discussed throughout this specification with reference to network device 120.

HSS 240 may perform various network functions, such as maintaining a central database that contains subscriber data (e.g., user-related information, subscription-related information, etc.). HSS 240 may also provide mobility management services, participate in establishing communication sessions (e.g., session initiation protocol (SIP) sessions), provide user device authentication services and/or provide user device authorization services. Similar to SGW 230, since network device 120 may be implemented by HSS 240, HSS 240 may also, or alternatively, be capable of executing a fail-open function and/or be capable of performing one or more other functions, processes, and/or operations discussed throughout this specification with reference to network device 120.

MME 250 may perform various network functions, such as operating as a control-node for one or more eNodeBs 210, tracking user devices 110 that have entered into an idle mode, and user device paging operations. MME 250 may also, or alternatively, perform network functions, such as choosing which SGW will be used to provide services to user devices 110 at certain times (e.g., during an initial attach procedure, an intra-LTE handover, etc.). MME 250 may be responsible for authenticating user devices (by communicating with HSS 240, generating and allocating temporary identities to user devices 110, activating and deactivating bearers, and/or one or more other types of network functions. Similar to SGW 230, network device 120 may be implemented by MME 250. As such, MME 250 may also, or alternatively, be capable of executing a fail-open function and/or be capable of performing one or more other functions, processes, and/or operations discussed throughout this specification with reference to network device 120.

PGW 260 may perform various network functions, such as assigning IP addresses to user devices 110, providing connectivity from user devices 110 to external networks (e.g., the Internet) and/or other packet data networks. PGW 260 may provide network policy enforcement, packet filtering, charging support, packet screening, and/or other network services. As mentioned above with reference to FIG. 1, since network node 140 may be implemented by PGW 260, PGW 260 may also, or alternatively, be capable of executing a fail-open function and/or be capable of performing one or more other functions, processes, and/or operations discussed throughout this specification with reference to network node 140.

Network 280 may be any type of network or combination of networks. For example, network 280 may include a LAN, a WAN (e.g., the Internet), or a telecommunications network (e.g., Long-Term Evolution (LTE) network, Global System for Mobile Communications (GSM) network, Universal Mobile Telecommunications System (UMTS) network, Code Division Multiple Access 2000 (CDMA2000) network, High-Speed Packet Access (HSPA) network, Worldwide Interoperability for Microwave Access (WiMAX) network, etc.). Additionally, or alternatively, network 220 may include a fiber optic (e.g., a fiber optic service (FiOS)) network, a metropolitan area network (MAN), an ad hoc network, a telephone network (e.g., a Public Switched Telephone Network (PSTN)), a cellular network, or a VoIP network.

While implementations herein are described primarily in the context of broadband services via LTE, other wireless protocols may be used. For example, components conforming to LTE standards described herein may be replaced by components conforming to other network protocols (e.g., GSM, WCDMA, UMB, UMTS, CDMA2000, HSPA, 802.11, or other network protocols).

Figure 3:
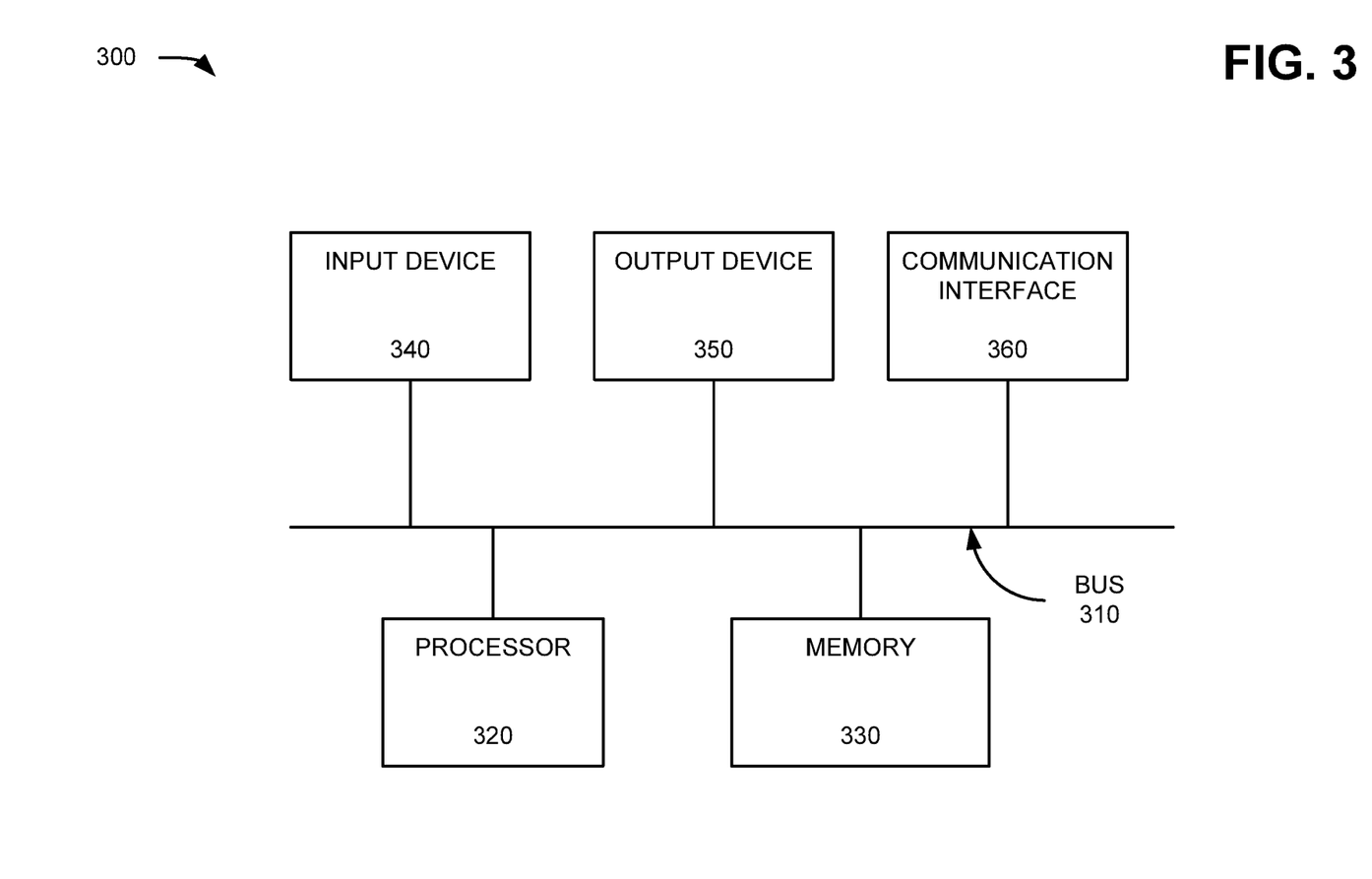
FIG. 3 is a diagram of example components of one or more devices of FIG. 2.

FIG. 3 is a diagram of example components of a device 300. For example, device 300 may correspond to user device 110, network device 120, subscriber data storage 130, network node 140, SGW 230, HSS 240, MME 250, and PGW 260. Each of user device 110, network device 120, subscriber data storage 130, network node 140, SGW 230, HSS 240, MME 250, and PGW 260 may include one or more device 300 or one or more of the components of device 300.

As depicted, device 300 may include bus 310, processor 320, memory 330, input device 340, output device 350, and communication interface 360. However, in other implementations, device 300 may include fewer components, additional components, different components, or differently arranged components than those illustrated in FIG. 3.

Bus 310 may include one or more component subsystems and/or communication paths that enable communication among the components of device 300. Processor 320 may include one or more processors, microprocessors, data processors, co-processors, network processors, application-specific integrated circuits (ASICs), controllers, programmable logic devices (PLDs), chipsets, field-programmable gate arrays (FPGAs), or other types of components that may interpret or execute instructions or data. Processor 320 may control the overall operation, or a portion thereof, of device 300, based on, for example, an operating system and/or various applications. Processor 320 may access instructions from memory 330, from other components of device 300, or from a source external to device 300 (e.g., a network or another device).

Memory 330 may include memory and/or secondary storage. For example, memory 330 may include random access memory (RAM), dynamic RAM (DRAM), read-only memory (ROM), programmable ROM (PROM), flash memory, or some other type of memory. Memory 330 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Input device 340 may include one or more components that permit a user to input information into device 300. For example, input device 340 may include a keypad, a button, a switch, a knob, fingerprint recognition logic, retinal scan logic, a web cam, voice recognition logic, a touchpad, an input port, a microphone, a display, or some other type of input component. Output device 350 may include one or more components that permit device 300 to output information to a user. For example, output device 350 may include a display, light-emitting diodes (LEDs), an output port, a speaker, or some other type of output component.

Communication interface 360 may include one or more components that permit device 300 to communicate with other devices or networks. For example, communication interface 360 may include some type of wireless or wired interface. Communication interface 330 may also include an antenna (or a set of antennas) that permit wireless communication, such as the transmission and reception of radio frequency (RF) signals.

As described herein, device 300 may perform certain operations in response to processor 320 executing software instructions contained in a computer-readable medium, such as memory 330. The software instructions may be read into memory 330 from another computer-readable medium or from another device via communication interface 360. The software instructions contained in memory 330 may cause processor 320 to perform one or more processes described herein. Alternatively, hardwired circuitry may be used in place of, or in combination with, software instructions to implement processes described herein. Thus, implementations described herein are not limited to any specific combination of hardware circuitry and software.

Figure 4:
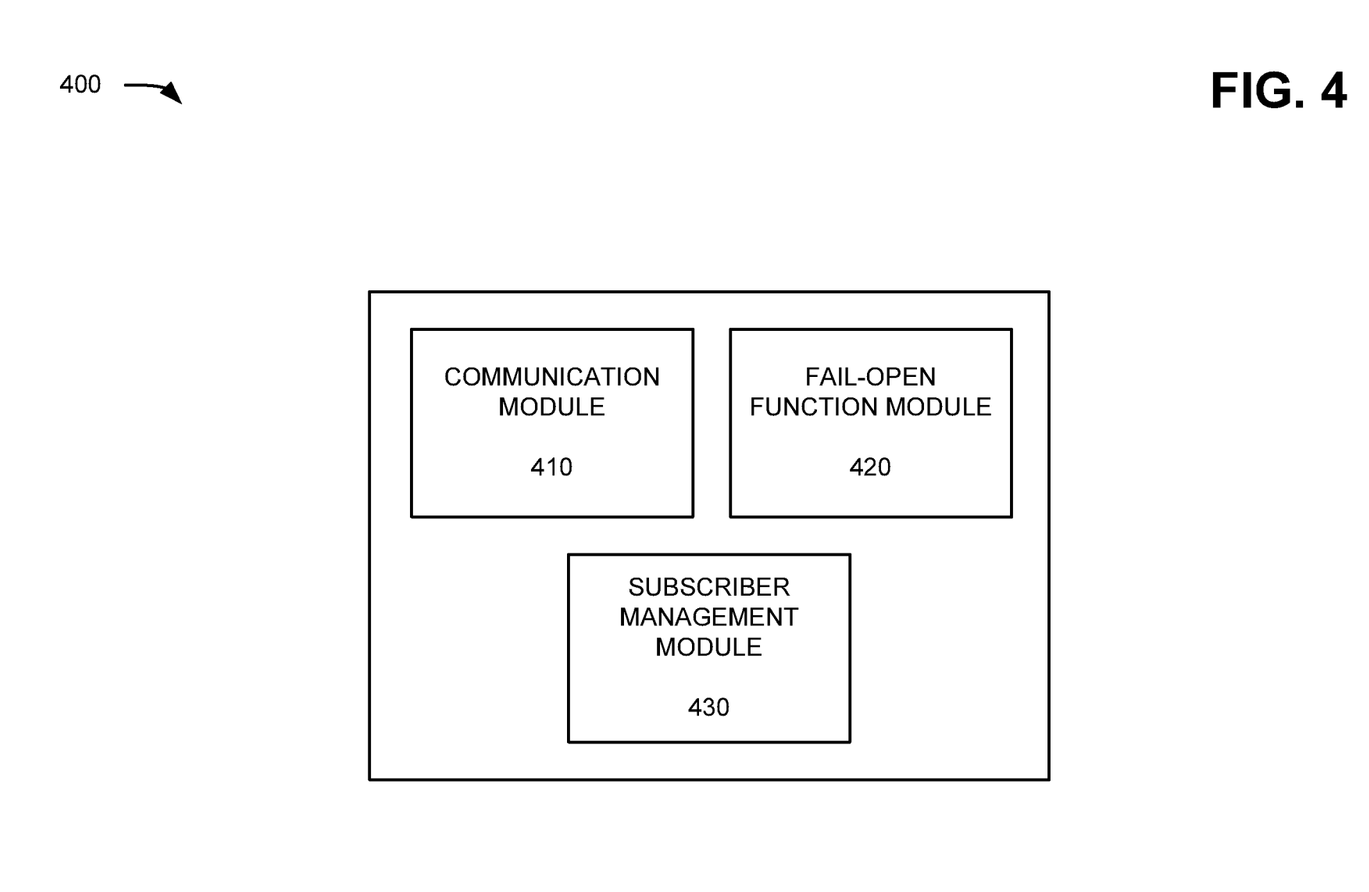
FIG. 4 is a diagram of example functional components of a network device according to one or more implementations described herein.

FIG. 4 is a diagram of example functional components of network device 400 according to one or more implementations described herein. In some implementations, device 400 may correspond to network device 120. In other implementations, device 400 may correspond to network node 140. As illustrated, user device 210 may include communication module 410, fail-open function module 420, and subscriber management module 430. Depending on the implementation, one or more of modules 410-430 may be implemented as a combination of hardware and software based on the components illustrated and described with respect to FIG. 3. Alternatively, modules 410-430 may each be implemented as hardware based on the components illustrated and described with respect to FIG. 3.

Communication module 410 may provide functionality regarding sending and/or receiving data. For example, in implementations where device 400 corresponds to network device 120, communication module 410 may enable network device 120 to communicate with user device 110, subscriber data storage 130, and/or network node 140, as described throughout this specification. By contrast, in implementations where device 400 corresponds to network node 140, communication module 410 may enable network device 120 to, for example, communicate with network node 120, subscriber data storage 130, and/or one or more other network nodes 140, as described throughout this specification.

Fail-open function module 420 may provide functionality regarding the execution of one or more fail-open operations as described herein. For example, in implementations where device 400 corresponds to network device 120, fail-open function module 420 may enable network device 120 to, for example, determine that subscriber data storage 130 is non-responsive and continue processing a call request without involving subscriber data storage 130. Similarly, in implementations where device 400 corresponds to network node 140, fail-open function module 420 may enable network node 140 to, for example, determine that subscriber data storage 130 is non-responsive and continue processing a call request without involving subscriber data storage 130.

In some implementations, network device 120 and/or network node 140 may determine that subscriber data storage 130 is non-responsive when subscriber data storage 130 fails to respond a request for subscriber data within a given period of time and/or a given number of requests for the subscriber data. However, in other implementations, network device 120 and/or network node 140 may determine that subscriber data storage 130 is non-responsive when subscriber data storage 130 responds to a request for subscriber data but the response from subscriber data storage 130 is not decipherable. Network device 120 and/or network node 140 may also, or alternatively, determine that subscriber data storage 130 is non-responsive when subscriber data storage 130 responds to a request for subscriber data but the response is not appropriate based on the request communicated to subscriber data storage 130. Additionally, or alternatively, network device 120 and/or network node 140 may determine that subscriber data storage 130 is non-responsive when a latency, based on a differential between a send time corresponding to the request for network access and a receive time associated with the at least one communication from the subscriber data storage, is beyond a selected threshold. In yet other implementations, network device 120 and/or network node 140 may also, or alternatively, determine that subscriber data storage 130 is non-responsive based on a notification from another network device 120 or network node 140.

Subscriber management module 430 may provide functionality with respect to managing one or more subscriber pools. For example, subscriber management module 430 may enable network device 120, or network node 140, to identify user device 110, determine whether user device 110 is associated with a particular pool of subscribers, and/or enable (or disable) one or more network services based on whether user device 110 is associated with the particular pool of subscribers. For instance, in implementations where device 400 corresponds to PGW 260, subscriber management module 430 may enable PGW 260 to determine that the user of user device 110 is a minor and prohibit user device 110 from accessing websites or other types of network content that is not intended for children. In another example, subscriber management module 430 may enable network device 120 (or network node 140) to determine that user device 110 is part of a government agency investigation and stream a copy of data sent to and from user device 110 to a network operated by the government agency.

Figure 5:
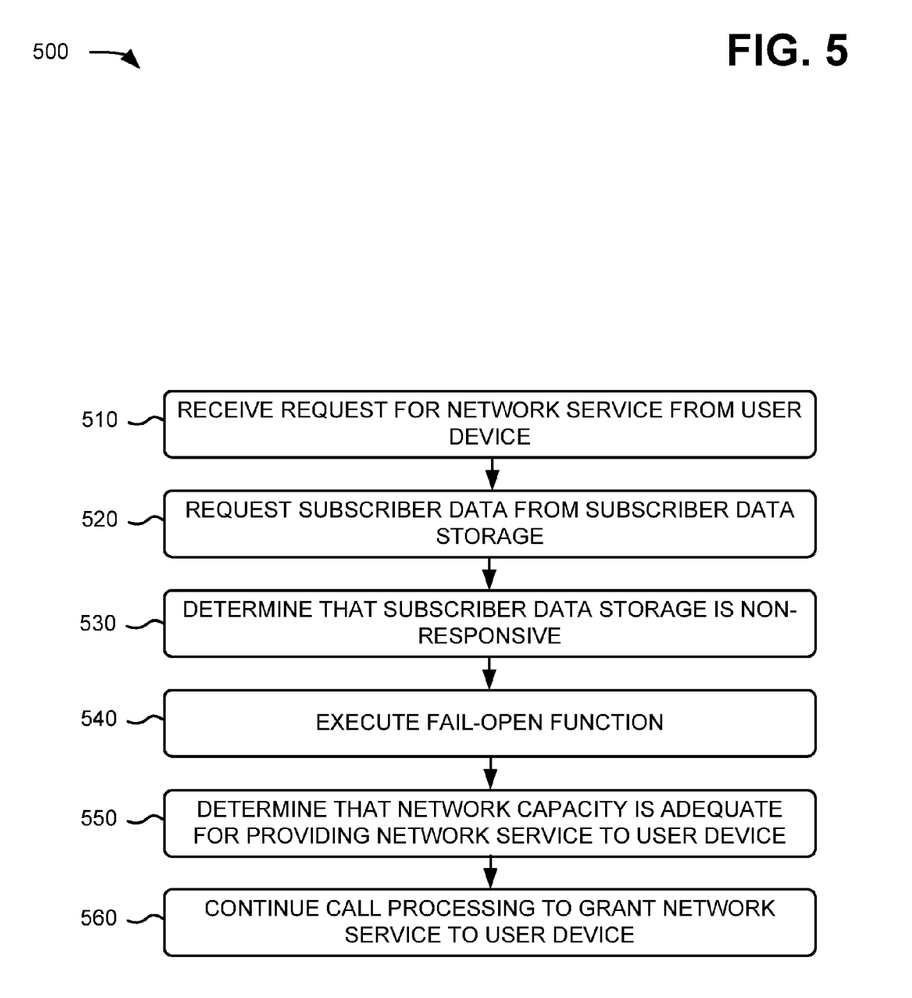
FIG. 5 is a diagram of an example process for executing a fail-open function according to one or more implementations described herein.

FIG. 5 is a diagram of an example process 500 for executing a fail-open function according to one or more implementations described herein. In one or more implementations, process 500 may be performed by one or more components of device 300. In other implementations, one or more blocks of process 500 may be performed by one or more other components/devices, or a group of components/devices, including or excluding device 300. For instance, as described below with reference to FIG. 6, network device 120 and network node 140 may each perform a version of process 500.

A request for a network service may be received (block 510). For example, network device 120 may receive a request for a network service from a device, such as user device 110 or another type of device. A request for a network service may include one or more protocol messages, such as a SIP INVITE message or another type of protocol message.

A request for subscriber data, from a subscriber data storage, may be made (block 520). For example, network device 120, in response to the received request, may communicate a request to subscriber data storage 130 for subscriber data. In some implementations, a request for subscriber data may include a SIP message (e.g., a SIP INVITE message) or some other type of message used to grant network access to user device 110.

A determination may be made that subscriber data storage 130 is non-responsive (block 530). For example, network device 120 (or network node 140) may determine that subscriber storage 130 is non-responsive. In some implementations, network device 120 (or network node 140) may make this determination by, for example, communicating one or more requests for subscriber data to subscriber data storage 130 without receiving a response from subscriber data storage 130. In some implementations, each request may be separated by a pre-selected time interval in order to provide subscriber data storage 130 with enough, or plenty, of time to respond to each request.

A fail-open function may be executed (block 540). For example, network device 120 (or network node 140) may execute, or participate in the execution of, a fail-open function in order to continue processing a request for network service without receiving subscriber data from subscriber data storage 130. In some implementations, network device 120 (or network node 140) may perform a fail-open function at some point after determining that subscriber data storage is non-responsive. In certain implementations, a fail-open function may include bypassing one or more call processing operations, involving subscriber data storage 130, that are typically performed or required under normal network conditions. In some implementations, executing a fail-open function may include authorizing the user device to access a set of network services, where the set of network services comprise a particular set of network services granted to all user devices while the fail-open function is being executed.

A determination may be made that there is adequate network capacity for providing the network service to user device (block 550). For example, network device 120 may determine whether there is adequate network capacity to provide the network service to user device 110. In some implementations, verifying that there is adequate network capacity to provide the network service to user device 110 may be significant since executing a fail-open function may cause a significant number of user devices 110 to gain network access, which may lead to a network overload. In certain implementations, if there is not adequate network capacity to support user device 110, network device 120 (or network node 140) may refuse to grant the network service to user device 110.

Call processing may be continued to grant network service to user device (block 560). For instance, network device 120 (or network node 140) may perform one or more call processing operations in order to respond to the network service request from user device 110. Network device 120 (or network node 140) may continue call processing at some point after executing, or initiating, the fail-open function.

In implementations where process 500 is performed by network device 120, call processing operations may include, for example, performing one or more operations relating to subscriber pools, as discussed herein, communicating a request from user device 110 to network node 140, receiving a positive response (e.g., a network parameter such as an Internet Protocol (IP) address for user device 110) from network node 140 regarding a pending network access request, communicating a positive response to user device 110, or one or more other types of call processing operations. Similarly, in implementations where process 500 is performed by network node 140, call processing operations may include, for example, performing one or more operations relating to subscriber pools, as discussed herein, relaying a network access request from user device 110 to another network node 140, receiving a positive response from another network node 140 regarding a pending network access request, communicating a positive response to network device 120 (or to another network node 140), or one or more other types of call processing operations.

While FIG. 5 shows a flowchart diagram of an example process 500 for executing a fail-open function, in other implementations, a process for executing a fail-open function may include fewer operations, different operations, differently arranged operations, or additional operations than depicted in FIG. 5. For instance, in some implementations, a process for executing a fail-open function may include one or more of receiving a notification that services provided by the subscriber data storage are available, discontinuing the fail-open function, and processing subsequent requests for network access by communicating with the subscriber data storage for subscriber authentication purposes.

Figure 6:
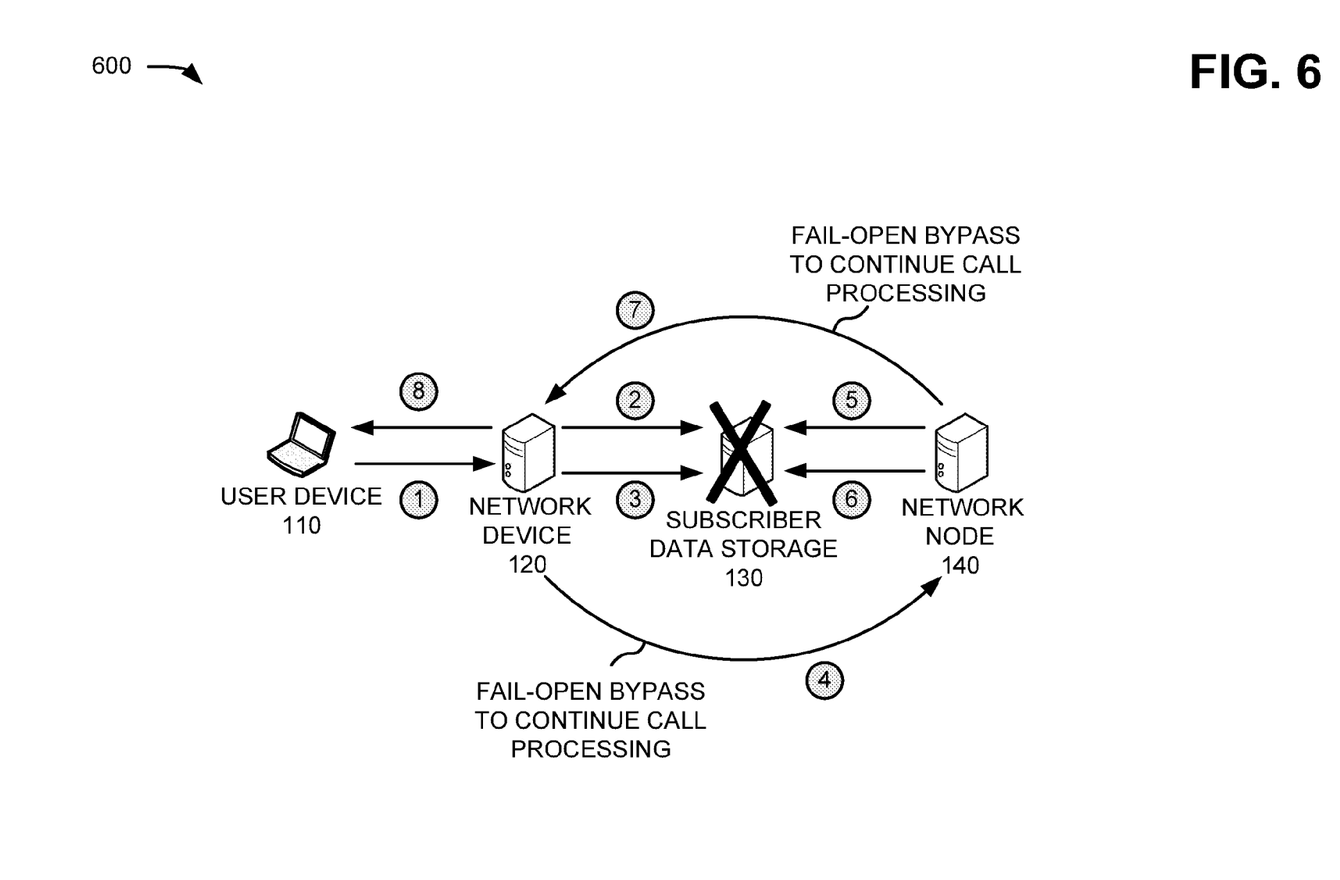
FIG. 6 is a diagram of an example fail-open function dataflow according to one or more implementations described herein.

FIG. 6 is a diagram of an example fail-open function dataflow 600 according to one or more implementations described herein. As depicted, dataflow 600 may include user device 110, network device 120, subscriber data storage 130, and network node 140. As mentioned above, network device 120 may be implemented as a PDSN, a SGW, a MME, or one or more other types of devices capable of operating in a network environment. Subscriber data storage 130 may be implemented as an HLR, a PCRF server, an AAA server, a HSS, or one or more other types of devices capable of operating in a network environment. Network node 140 may be implemented as a HA, a PGW, or one or more other types of devices capable of operating in a network environment.

In one or more implementations, fail-open function dataflow 600 may be performed by one or more components of network device 120 and/or network node 140. However, in other implementations, one or more operations of fail-open function dataflow 600 may be performed by one or more other components/devices, or a group of components/devices, including or excluding network device 120 and/or network node 140. While data flow 600 includes one user device 110, one network device 120, one subscriber data storage 130, and one network node 140, other implementations of dataflow 600 may include multiple instances or types of any of the depicted systems or devices.

Network device 120 may receive a request for a network service from user device 110 (event 1). In some implementations, the request may be a request for 2G network services, 3G network services, or 4G network services. At some point after receiving the request for the network service, network device 120 may communicate a first request for subscriber data from subscriber data storage 130 (event 2). In some implementations, if a first pre-selected time interval expires before network device 120 receives a response to the first request for subscriber data, network device 120 may send a second request for subscriber data to subscriber data storage 130 (event 3).

Additionally, or alternatively, if a second pre-selected time interval expires before network device 120 receives a response to the second request for subscriber data, network device 120 may execute a fail-open function (event 4), which may include bypassing subscriber data storage 130 in a call processing procedure. In other words, network device 120 may proceed with processing the request for the network service by communicating the request for the network service to network node 140 without receiving subscriber data from subscriber data storage 130.

Similar to network device 120, at some point after receiving the request for the network service (event 4), network node 140 may communicate a first request for subscriber data from subscriber data storage 130 (event 5). In some implementations, if a first pre-selected time interval expires before network node 140 receives a response to the first request for subscriber data, network node 140 may send a second request for subscriber data to subscriber data storage 130 (event 6).

Additionally, or alternatively, if a second pre-selected time interval expires before network node 140 receives a response to the second request for subscriber data, network node 140 may execute a fail-open function (event 7), which may include bypassing subscriber data storage 130 in a call processing procedure. In other words, similar to network device 120, network node 140 may continue processing the request for the network service by communicating the request for the network service to network device 120 without receiving subscriber data from subscriber data storage 130. At some point after receiving a positive response from network node 140, network device 120 may grant network access to user device 110. In some implementations, the network access granted may be limited to one or more network services (e.g., voice calling services, text message services, e-mail services, etc.).

While FIG. 6 provides an example dataflow 600 involving two requests for subscriber data from network device 120 (event 2 and event 3), and two requests for subscriber data from network device 120 (event 5 and event 6), in other implementations, dataflow 600 may include fewer requests for subscriber data or additional requests for subscriber data then presented in FIG. 6. Similarly, while FIG. 6 provides an example dataflow 600 involving one network device 120, one subscriber data storage 130, and one network node 140, other implementations of dataflow 600 may include different or additional systems or devices, than those presented in FIG. 6, before initiating the fail-open function.

Figure 7:
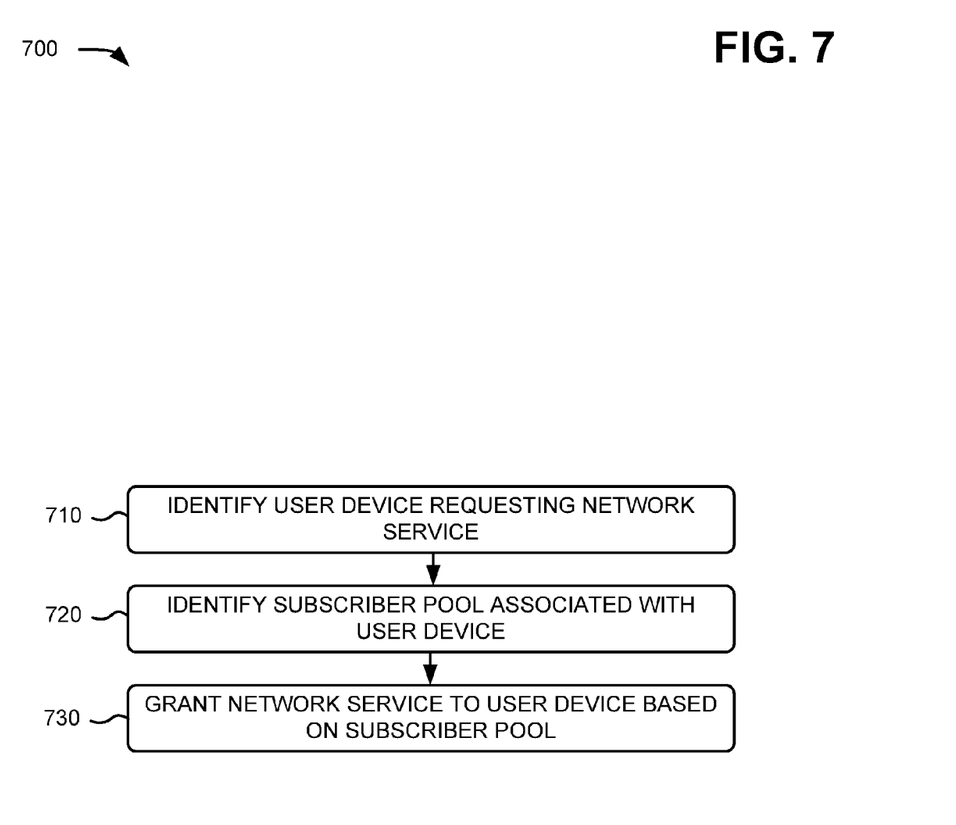
FIG. 7 is a diagram of an example process for granting network services based on subscriber pools according to one or more implementations described herein.

FIG. 7 is a diagram of an example process 700 for granting a network service according to one or more implementations described herein. In one or more implementations, process 700 may be performed by one or more components of device 300. In other implementations, one or more blocks of process 700 may be performed by one or more other components/devices, or a group of components/devices, including or excluding device 300.

A user device, requesting a network service, may be identified (block 710). For example, network device 120 (or network node 140) may receive a request for a network service from user device 110 and identify user device 110 based on an identifier included in the request. As mentioned above, in some implementations, the request for the network service may be implemented as a SIP INVITE message and the identifier may be implemented as an international mobile subscriber identity (IMSI) or other type of device identifier.

A subscriber pool associated with the user device may be identified (block 720). For instance, network device 120 (or network node 140) may identify one or more subscriber pools associated with user device 110. For example, as described above with reference to FIG. 4, network device 120 (or network node 140) may determine that user device 110 is associated with a subscriber pool designated for minors or one or more other types of subscriber pools. In certain implementations, each subscriber pool may be associated with a particular set of permissions, authorizations, or network services, which can be granted to user device 110 (block 730).

While FIG. 7 shows a flowchart diagram of an example process 700 for granting a network service, in other implementations, a process for granting a network service may include fewer operations, different operations, differently arranged operations, or additional operations than depicted in FIG. 7.

Figure 8:
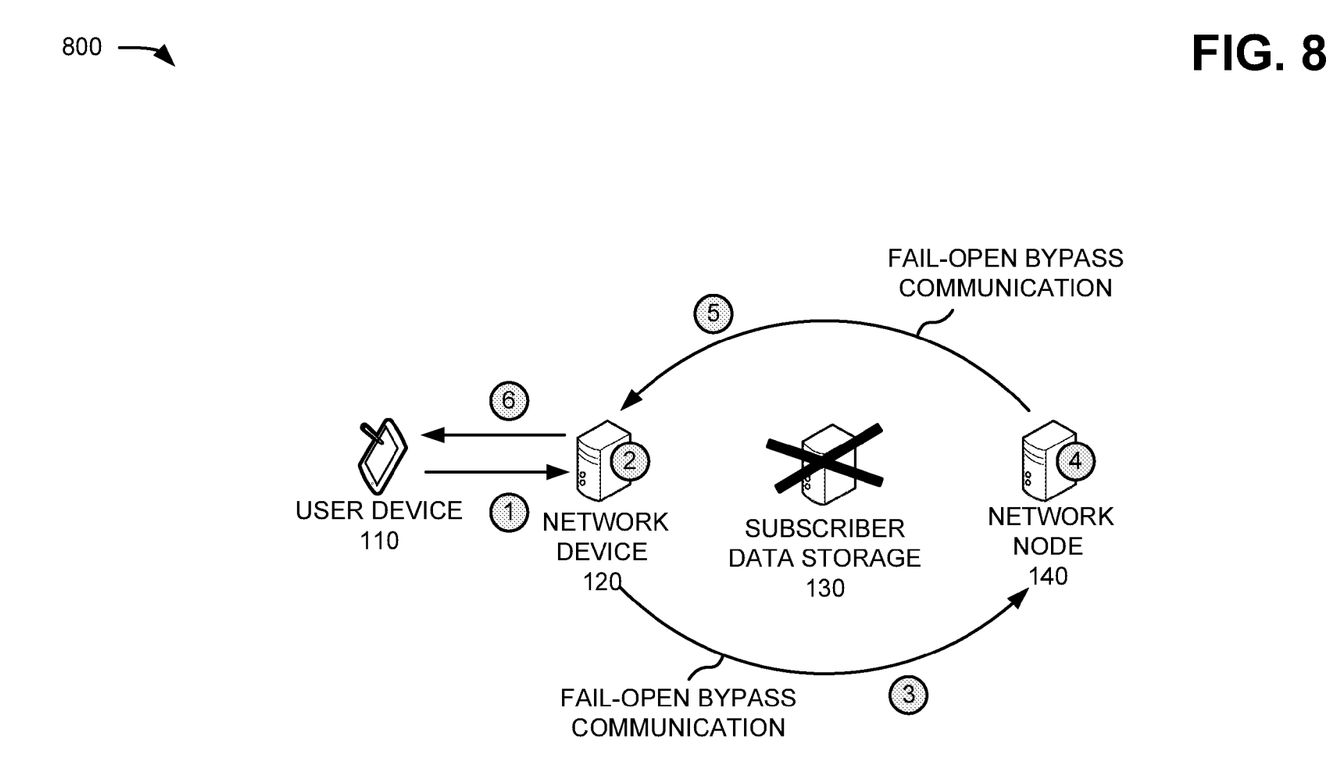
FIG. 8 is a diagram of an example of another fail-open function dataflow according to one or more implementations described herein.

FIG. 8 is a diagram of an example of another fail-open function dataflow 800 according to one or more implementations described herein. In one or more implementations, dataflow 800 may be performed by one or more components of network device 120. In other implementations, one or more blocks of process 800 may be performed by one or more other components/devices, or a group of components/devices, including or excluding network device 120. In some implementations, fail-open function dataflow 800 may correspond to an ongoing fail-open function (e.g., a fail-open function that was initiated prior to one of the events or operations depicted in FIG. 8). In other words, fail-open function dataflow 800 may be ongoing in the sense that the corresponding fail-open function was initiated prior to the events depicted in FIG. 8.

Similar to fail-open function 600 of FIG. 6. network device 120 may receive a request for network access from user device 110. However, as opposed to attempting to communicate with subscriber data storage 130, network device 120 may note or otherwise determine that the fail-open function is still running (event 2), and at some point thereafter continue processing the request from user device 110 without, for example, authenticating user device 110. For instance, network device 120 may send the request from user device 110 to network node 140 (event 4). Similar to network device 120, at some point after receiving the request from network device 120, network node 140 may note or otherwise determine that the fail-open function is still running (event 3). Additionally, or alternatively, network node 140 may proceed with processing the request for network services without communicating with subscriber data storage 130, which may include responding positively to network device 120 (event 5). In turn, network device 120 may respond positively to user device 110 (event 6) and grant network access to user device 110. Dataflow 800 may provide a solution for providing network access to user devices 110 even when a subscriber data storage 130, such as an HLR, an HSS, an AAA, or another type of subscriber data storage device ceases to function properly.

While FIG. 8 provides an example dataflow 800 involving one network device 120, one subscriber data storage 130, and one network node 140, other implementations of dataflow 800 may include different or additional systems or devices, than those presented in FIG. 8, before initiating the fail-open function.

Figure 9:
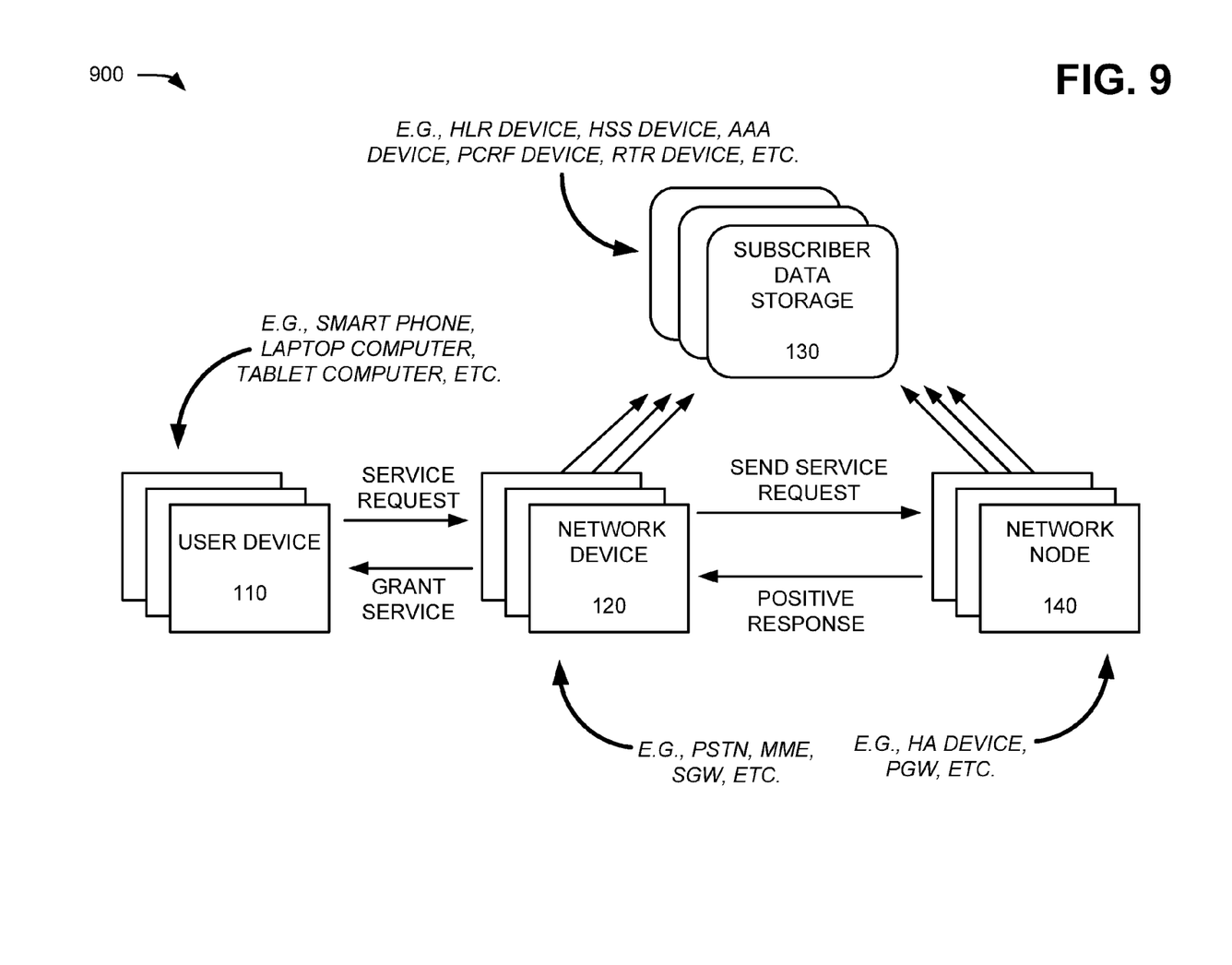
FIG. 9 is a diagram of an example system according to one or more implementations described herein.

FIG. 9 is a diagram of an example system 900 in accordance with one or more implementations described herein. System 900 may include user devices 110, network devices 120, network nodes 140, and subscriber data storage devices 130. One or more of the systems or devices of FIG. 9 may correspond to one or more of the systems or devices discussed elsewhere in this specification.

For instance, network device 120 may include a PSDN, an HSS, an SGW, or one or more other types of devices capable of operating in a network environment and/or performing one or more of the operations described herein. As another example, subscriber data storage 140 may include an AAA server, an HHS device, an HLR server, or one or more other types of devices capable of storing subscriber data and/or performing one or more of the operations described herein. Network node 140 may include a HA device, or one or more other types of devices capable of operating in a network environment and/or performing one or more of the operations described herein.

One or more user devices 110 may communicate requests that may be received by one or more network devices 120. One or more of network devices 120 may attempt to communicate with at least one subscriber data storage 130. However, subscriber data storage 130 may, for example, fail to respond to any of the attempted communications from network devices 120. At some point, one or more network devices 120 may determine that subscriber data storage 130 in no longer operating properly, and one or more of network devices 120 may execute a fail-open function in order to bypass subscriber data storage 130 and continue with processing the request for service from user device 110.

For instance, one or more network devices 120 may communicate the request for access to network nodes 140. Similar to network devices 120, one or more network nodes 140 may attempt to contact at least one subscriber data storage 130, and later realize that subscriber data storage 130 is not functioning. Network nodes 140 may then, similar to network devices 120, execute a fail-open function in order to continue processing the requests for services from user devices 110. For example, as illustrated, network nodes 140 may respond to the requests for services forwarded by network devices 120, which, may in turn, grant network access to one or more user devices 110.

In one or more implementations, described herein, devices may be used to enhance network robustness and reliability by implementing one or more network fail-open functions. For example, network device 120, such as a serving gateway (SGW), may receive a request for network access from user device 110. Network device 110 may communicate a first request to subscriber data storage 130, such as a HSS, for subscriber data, corresponding to user device 110, to verify whether the user device may be granted network access.

At some point, network device may 120 determine that subscriber data storage 130 is non-responsive and may execute a fail-open function in response to the non-responsiveness of subscriber data storage 130. Execution of the fail-open function may involve a variety of one or more types of operations, such as processing the request for network access and grating network access to user device 110 without having received subscriber data from the subscriber data storage 130 or without performing an authentication operation, an authorization operation, an identification operation, a validation operation, and/or one or more other types of operations relating to granting network access to user devices. In one or more implementations described herein, therefore, fail-open functions may be used to ensure that a network may continue to provide services to subscribers even when a network system or device of fundamental importance to the network suddenly begins to, for example, operate at an inadequate level or suddenly ceases to function altogether.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a component that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a network device and from a user device, a request to access a Long Term Evolution network, wherein the network device includes a Long Term Evolution Serving Gateway or a Long Term Evolution Mobility Management Entity;
   communicating, by the network device, a request, to a subscriber data storage device, for subscriber data, corresponding to the user device, to verify whether the user device is permitted to access the Long Term Evolution network;
   determining, by the network device and in response to communicating the request to the subscriber data storage device, that the subscriber data storage device is nonresponsive; and
   executing, by the network device, a fail-open function in response to determining that the subscriber data storage device is non-responsive, wherein executing the fail-open function comprises:
   selecting to bypass a call processing operation associated with the subscriber data storage device, wherein the call processing operation is used by the network device to verify that the user device is permitted to access the Long Term Evolution network, and
   granting access to the Long Term Evolution network to the user device without performing the call processing operation.

2. The method of claim 1, wherein selecting to bypass a call processing operation associated with the subscriber data storage device comprises:
   communicating a request for network access to a network node,
   receiving a positive response from the network node in response to the request for network access, and
   notifying the user device that the user device has been granted network access.

3. The method of claim 1, wherein determining that the subscriber data storage device is non-responsive comprises:
   determining whether the subscriber data storage device responds, to the request for subscriber data, within a first time interval;
   communicating another request for the subscriber data to the subscriber data storage device upon expiration of the first time interval;
   determining whether the subscriber data storage device respond, to the other request for the subscriber data, within a second time interval; and
   determining that the subscriber data storage device is non-responsive upon expiration of the second time interval.

4. The method of claim 1, wherein determining that the subscriber data storage device is non-responsive comprises:
   receiving at least one communication from the subscriber data storage device,
   evaluating the at least one communication from the subscriber data storage device, and
   determining that the subscriber data storage device is not functioning based on the at least one communication from the subscriber data storage device.

5. The method of claim 4, wherein evaluating the at least one communication from the subscriber data storage device comprises at least one of:
   determining whether the at least one communication from the subscriber data storage device is decipherable,
   determining whether the at least one communication from the subscriber data storage device is appropriate based on the request, communicated to the subscriber data storage device, regarding network access for the user device, or
   determining a latency based on a differential between a send time corresponding to the request for network access and a receive time associated with the at least one communication from the subscriber data storage device, relative to a particular threshold.

6. The method of claim 1, wherein determining that the subscriber data storage device is non-responsive comprises:
receiving a notification from another network device that services provided by the subscriber data storage device are currently unavailable.

7. The method of claim 1, wherein the subscriber data storage device comprises at least one of:
a home location register (HLR) device that stores subscriber data and provides subscriber data to the network device in response to subscriber data requests from the network device,
an authentication, authorization, and accounting (AAA) server that performs an authentication function, an authorization function, and an accounting function for user devices,
a policy control rating function (PCRF) server that determines policy rules in a multimedia network,
a home subscriber server (HSS) that stores subscriber data and performs authentication functions and authorization functions corresponding to user devices, or
a real-time reporting (RTR) server that stores subscriber data and provides subscriber data to the network device in response to subscriber data requests from the network device.

8. The method of claim 1, further comprising:
receiving a notification that services provided by the subscriber data storage device are available;
discontinuing the fail-open function; and
and processing subsequent requests for network access by communicating with the subscriber data storage device for subscriber authentication purposes.

9. The method of claim 1, where executing the fail-open function comprises:
authorizing the user device to access a set of network services, where the set of network services comprises a standardized set of network services granted to all user devices while the fail-open function is being executed.

10. The method of claim 1, wherein executing the fail-open function comprises:
identifying the user device,
determining whether the user device belongs to at least one of a plurality of pools of subscribers,
when the user device does not belong to the at least one of the plurality of pools of subscribers, authorizing the user device to access a first pre-selected set of network services;
when the user device does belong to the at least one of the plurality of pools of subscribers,
identifying the at least one of the plurality of pools of subscribers,
identifying a second pre-selected set of network services allocated to user devices that belong to the at least one of the plurality of pools of subscribers, and
authorizing the user device to access the second pre-selected set of network services, wherein the first pre-selected set of network services is different from the second pre-selected set of network services.

11. The method of claim 1, wherein processing the request for network access further comprises:
communicating a request for network services to another network device capable of providing at least one network parameter to enable the user device to access the Long Term Evolution network;
receiving the at least one network parameter from the other network device; and
providing the at least one network parameter to the user device.

12. The method of claim 11, further comprising:
in response to receiving the request for network services from the network device, communicating, by the other network device, an additional request to the subscriber data storage device for subscriber data corresponding to the user device,
determining, by the other network device, that the subscriber data storage device is non-responsive,
initiating, by the other network device, a fail-open function in response to determining that the subscriber data storage device is non-responsive, and
communicating, by the other network device, the at least one network parameter to the network device in accordance with the fail-open function.

13. A network device, comprising:
a memory to store instructions; and
a processor, configured to execute the stored instructions to:
function as a Long Term Evolution Serving Gateway or a Long Term Evolution Mobility Management Entity,
receive, from a user device, a request to access a Long Term Evolution network,
send a request to a subscriber data storage device, in response to the request for network access from the user device, for subscriber data corresponding to the user device in order to determine whether the user device is permitted to access the Long Term Evolution network, and
prior to receiving subscriber data from the subscriber data storage device, detect that the subscriber data storage device is unavailable, and
enter into a fail-open mode of operation in response to the unavailability of the subscriber data storage device, wherein, in accordance with the fail-open mode of operation, the processor is configured to:
select to bypass a call processing operation associated with the subscriber data storage device, wherein the call processing operation is used by the network device to verify that the user device is permitted to access the Long Term Evolution network,
determine whether the user device is associated with a pool of subscribers,
authorize the user device to access a set of network services and notify the user device that the user device has been granted access to the Long Term Evolution network, based on determining that the user device is associated with the pool of subscribers, and
refuse the request to access the Long Term Evolution network from the user device, based on determining that the user device is not associated with the pool of subscribers.

14. The network device of claim 13, wherein, to detect that the subscriber data storage device is unavailable, the processor is further configured to execute the stored instructions to:
determine whether the subscriber data storage device responds to a request for subscriber data within a first time interval,
communicate another request for the subscriber data to the subscriber data storage device upon expiration of the first time interval,
determine whether the subscriber data storage device responds to the other request for the subscriber data within a second time interval, and determine that the subscriber data storage device is unavailable upon expiration of the second time interval.

15. The network device of claim 13, wherein, to detect that the subscriber data storage device is unavailable, the processor is further configured to execute the stored instructions to:
receive at least one communication from the subscriber data storage device,
evaluate the at least one communication from the subscriber data storage device, and
determine that the subscriber data storage device is unavailable based on the at least one communication from the subscriber data storage device.

16. The network device of claim 13, wherein, to detect that the subscriber data storage device is unavailable, the processor is further configured to execute the stored instructions to:
receive a notification, from another network device, that services provided by the subscriber data storage device are currently unavailable.

17. A non-transitory computer-readable medium storing a program for causing a network device to perform a method, the method comprising:
receiving, from a user device, a request to access a Long Term Evolution network from a user device;
communicating a request, to a subscriber data storage device, for subscriber data corresponding to the user device, where the subscriber data verifies whether the user device is permitted to access the Long Term Evolution network;
determining that the subscriber data storage is non-responsive;
executing a fail-open function, in response to determining that the subscriber data storage device is non-responsive, to grant access to the Long Term Evolution network to the device without receiving the subscriber data from the subscriber data storage, wherein executing the fail-open function comprises:
selecting to bypass a call processing operation associated with the subscriber data storage device, wherein the call processing operation is used to verify that the user device is permitted to access the Long Term Evolution network, and
granting access to the Long Term Evolution network to the user device without performing the call processing operation; and
notifying the user device that the user device is authorized to access the Long Term Evolution network as part of executing the fail-open function.

18. The non-transitory computer-readable medium of claim 17, wherein determining that the subscriber data storage device is non-responsive comprises:
determining whether the subscriber data storage device respond to a request for subscriber data within a first time interval;
communicating another request for the subscriber data to the subscriber data storage device upon expiration of the first time interval;
determining whether the subscriber data storage device responds, to the other request for the subscriber data, within a second time interval; and
determining that the subscriber data storage device is non-responsive upon expiration of the second time interval.

* * * * *